(12) United States Patent
Varney

(10) Patent No.: US 11,796,174 B2
(45) Date of Patent: Oct. 24, 2023

(54) CMC COMBUSTOR SHELL WITH INTEGRAL CHUTES

(71) Applicant: Rolls-Royce Corporation, Indianapolis, IN (US)

(72) Inventor: Bruce Edward Varney, Greenwood, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 1128 days.

(21) Appl. No.: 16/518,575

(22) Filed: Jul. 22, 2019

(65) Prior Publication Data

US 2020/0103112 A1   Apr. 2, 2020

Related U.S. Application Data

(62) Division of application No. 14/834,605, filed on Aug. 25, 2015, now abandoned.

(51) Int. Cl.
*C04B 35/66* (2006.01)
*C04B 41/81* (2006.01)
(Continued)

(52) U.S. Cl.
CPC .............. *F23R 3/007* (2013.01); *B28B 21/72* (2013.01); *B28B 21/98* (2013.01); *C04B 35/71* (2013.01);
(Continued)

(58) Field of Classification Search
CPC ...... F23R 3/007; F23R 3/045; C04B 41/4539; C04B 41/4529; C04B 41/45; C04B 35/71
See application file for complete search history.

(56) References Cited

U.S. PATENT DOCUMENTS 3,656,297 A   4/1972 Monk
3,735,589 A   5/1973 Caruel
(Continued)

FOREIGN PATENT DOCUMENTS

DE       102 14 574 A1   10/2003
DE   102012 015 452 A1    4/2014
(Continued)

OTHER PUBLICATIONS

Ikeda "JP 11-255567, machine translation" published (Year: 1999).*
(Continued)

*Primary Examiner* — Alex B Efta
(74) *Attorney, Agent, or Firm* — Crowell & Moring LLP

(57) ABSTRACT

A combustion assembly for a gas turbine engine may be provided. The combustion assembly may include a ceramic matrix composite combustor shell, which may include a chamber defined by a wall of the ceramic matrix composite combustor shell, and the ceramic matrix composite combustor shell may include a ceramic matrix composite chute integral with the ceramic matrix composite combustor shell. The ceramic matrix composite chute may extend towards a midline of the chamber. A method for fabricating a ceramic matrix composite chute may be provided. At least one chute may be woven in three dimensions into a ceramic preform. A layup tool may be inserted into the chute. The chute may be enlarged with the layup tool. The ceramic preform may be formed into a ceramic matrix composite body, which includes a combustor shell and the chute.

20 Claims, 7 Drawing Sheets

(51) Int. Cl.
*F23R 3/06* (2006.01)
*F23R 3/00* (2006.01)
*C04B 41/45* (2006.01)
*B28B 21/72* (2006.01)
*B28B 21/98* (2006.01)
*C04B 35/71* (2006.01)
*C04B 38/00* (2006.01)
*F23R 3/04* (2006.01)

(52) U.S. Cl.
CPC .......... *C04B 38/0093* (2013.01); *C04B 41/45* (2013.01); *C04B 41/4523* (2013.01); *C04B 41/4529* (2013.01); *C04B 41/4539* (2013.01); *C04B 41/81* (2013.01); *F23R 3/045* (2013.01); *F23R 3/06* (2013.01); *F23R 2900/00018* (2013.01)

(56) References Cited

U.S. PATENT DOCUMENTS

| | | |
|---|---|---|
| 3,981,142 A | 9/1976 | Irwin |
| 5,590,530 A | 1/1997 | Owen et al. |
| 5,687,572 A | 11/1997 | Schrantz et al. |
| 6,351,949 B1 | 3/2002 | Rice et al. |
| 6,397,603 B1 | 6/2002 | Edmondson |
| 6,668,559 B2 | 12/2003 | Calvez et al. |
| 7,371,043 B2 | 5/2008 | Keller |
| 7,788,928 B2 | 9/2010 | De Sousa et al. |
| 8,141,364 B2 | 3/2012 | Benoit et al. |
| 8,616,004 B2 | 12/2013 | Zupanc |
| 8,745,989 B2 | 6/2014 | Prociw et al. |
| 8,756,935 B2 | 6/2014 | Duval et al. |
| 8,943,835 B2 | 2/2015 | Corsmeier et al. |
| 2002/0184892 A1 | 12/2002 | Calvez |
| 2003/0031555 A1 | 2/2003 | Noe et al. |
| 2004/0221941 A1 | 11/2004 | Bouillon |
| 2008/0134682 A1* | 6/2008 | Garry .................. F23R 3/06 60/752 |
| 2010/0024427 A1 | 2/2010 | Graves |
| 2012/0100321 A1* | 4/2012 | Goering ............ B32B 5/024 428/36.1 |
| 2013/0255265 A1* | 10/2013 | Rudrapatna .......... F23R 3/16 29/889.22 |
| 2015/0226085 A1 | 8/2015 | Spangler et al. |
| 2016/0215980 A1* | 7/2016 | Chang .................. F23R 3/50 |

FOREIGN PATENT DOCUMENTS

| | | |
|---|---|---|
| JP | 11255567 A * | 9/1999 |
| WO | WO 2014/4193565 A1 | 12/2014 |

OTHER PUBLICATIONS

European Examination Report from corresponding European application No. 16185097.9, 4pp., dated Oct. 17, 2019.
European Examination Report from corresponding European application No. 16185097.9, 4pp., dated Jul. 10, 2020.
European Search Report from corresponding European application No. 16185097.9, 6pp., dated Jan. 5, 2017.

* cited by examiner

CMC COMBUSTOR SHELL WITH INTEGRAL CHUTES

RELATED APPLICATION

The present patent document is a divisional of U.S. patent application Ser. No. 14/834,605, filed Aug. 25, 2015. The contents of the prior application is hereby incorporated in its entirety.

TECHNICAL FIELD

This disclosure relates to ceramic matrix composite (CMC) components and, in particular, to CMC combustor shells.

BACKGROUND

Present approaches to attaching chutes to ceramic matrix composite combustor shells suffer from a variety of drawbacks, limitations, and disadvantages. There is a need for the inventive ceramic matrix composite components, apparatuses, systems and methods disclosed herein.

BRIEF SUMMARY

A combustion assembly for a gas turbine engine may be provided. The combustion assembly for the gas turbine engine may include a ceramic matrix composite combustor shell. The ceramic matrix composite combustor shell may include a chamber defined by a wall of the ceramic matrix composite combustor shell and a ceramic matrix composite chute integral with the ceramic matrix composite combustor shell. The ceramic matrix composite chute may extend towards a midline of the chamber of the ceramic matrix composite combustor shell.

A method for fabricating a ceramic matrix composite chute may be provided. A porous ceramic preform comprising a plurality of ceramic fibers may be formed. An aperture in the porous ceramic preform may be formed. The aperture may be enlarged into a chute shape by inserting a layup tool into the aperture. The porous ceramic preform may be formed into a ceramic matrix composite body, which includes a combustor shell and a chute.

Another method for fabricating a ceramic matrix composite chute may be provided. A ceramic preform may be formed into a frame for a combustor shell and a chute. The ceramic preform may be formed into a ceramic matrix composite body including the combustor shell and the chute. An aperture in the ceramic preform may be enlarged with a layup tool.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of introduction, in one example, a combustion assembly for a gas turbine engine may be provided. The combustion assembly may include a ceramic matrix composite combustion liner that attaches to a combustor and is located in a chamber of the combustor. The ceramic matrix composite combustion liner may alternatively be referred to herein as a ceramic matrix composite liner or liner. The chamber may be defined by a wall of the combustor and the ceramic matrix composite liner may include a ceramic matrix composite chute integral with the ceramic matrix composite liner. The ceramic matrix composite chute may extend towards a midline of the chamber of the combustor.

Advantageously, the ceramic matrix composite chute may direct mixing air so that the mixing performance of the combustor is enhanced. By fabricating the ceramic matrix composite chute integral with the ceramic matrix composite liner, any difficulties in attaching chutes to ceramic matrix composite liners may be avoided. Fabricating the ceramic matrix composite chute integral with the ceramic matrix composite liner may allow a variety of chute shapes to be used.

Figure 1:
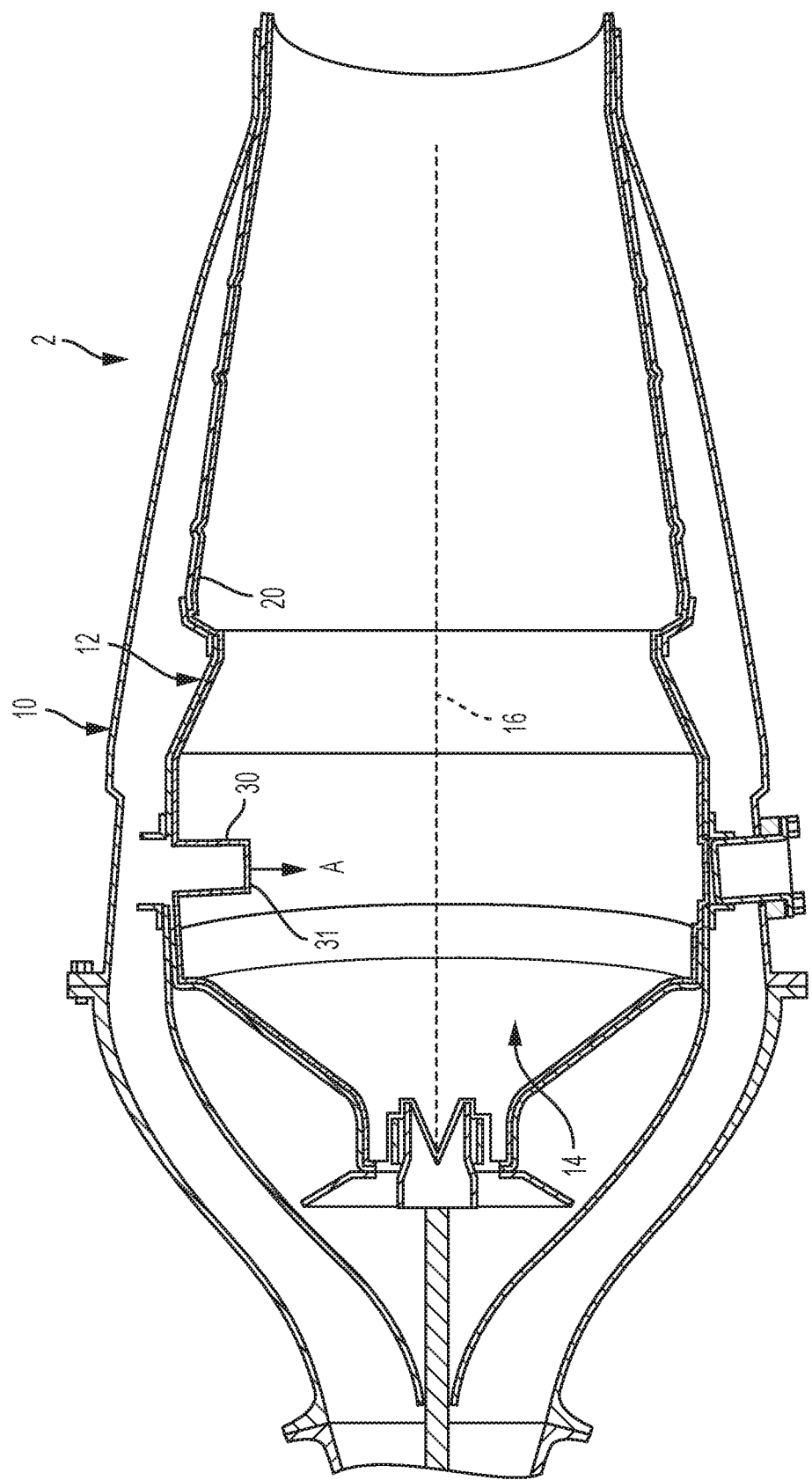
FIG. 1 illustrates a cross-sectional view of a combustion assembly for a gas turbine engine.

FIG. 1 is a cross-sectional view of a combustion assembly 2 for a gas turbine engine. The gas turbine engine may be an internal combustion engine that has an upstream rotating compressor coupled to a downstream turbine, and a combustor 10 in between. The combustion assembly 2 may be a component capable of withstanding high temperatures, for example temperatures above 1000 degrees Celsius. The combustion assembly 2 may include, for example, the combustor 10, a ceramic matrix composite liner 20, and a ceramic matrix composite chute 30. In some examples, the combustion assembly 2 may include a ceramic matrix composite coating, an environmental barrier coating, or a combination thereof.

The combustor 10 may comprise a wall 12 that defines a chamber 14. The combustor 10 may be a portion of the gas turbine engine where combustion takes place. The combustor 10 may be a component in which fuel is ignited in the gas turbine engine. In some examples, the combustor 10 may be a component in which air and fuel are combined and ignited. Examples of the combustor 10 may include a can, cannular, annular, or double annular combustor.

Figure 2:
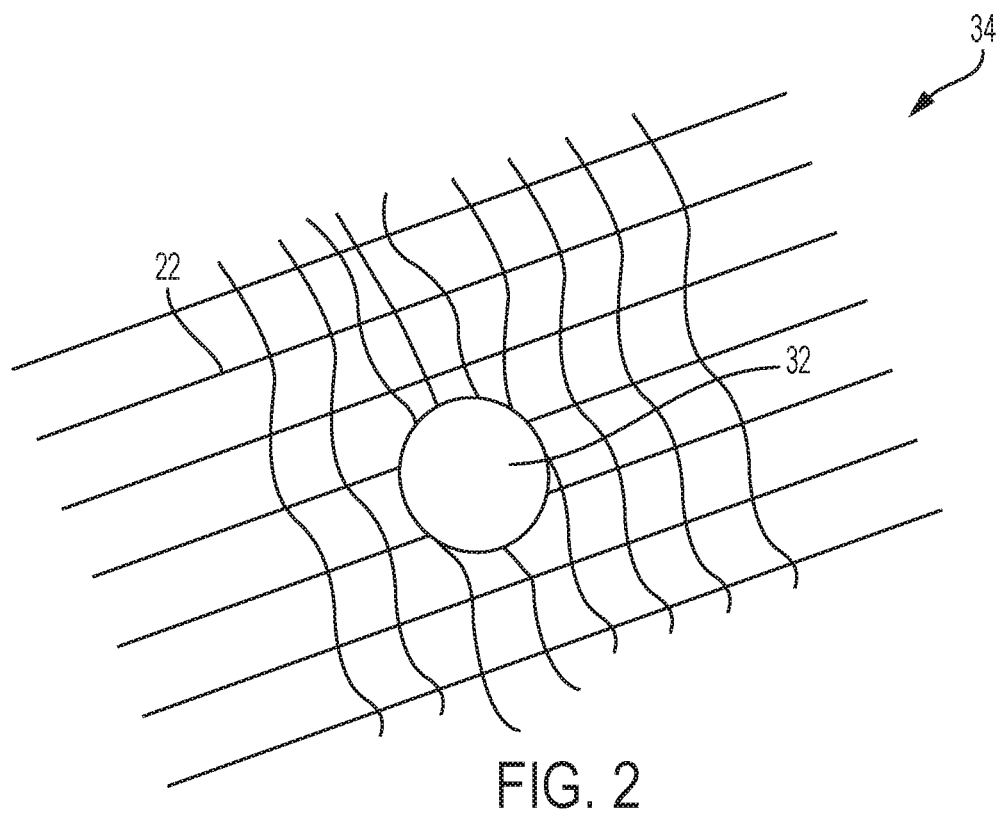
FIG. 2 illustrates a plan view of an example of a ceramic preform comprising a plurality of ceramic fibers.
Figure 3:
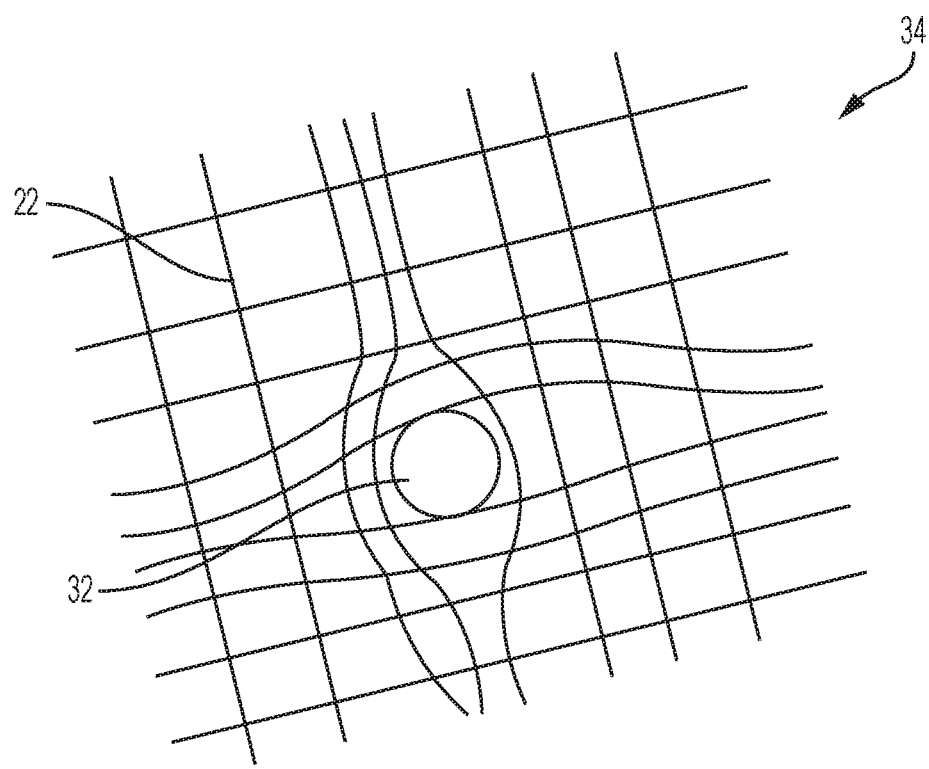
FIG. 3 illustrates a plan view of another example of a ceramic preform comprising a plurality of ceramic fibers.

The ceramic matrix composite liner 20 may be a component made of a ceramic matrix composite material that covers an inner surface of the combustor 10. The ceramic matrix composite liner 20 may cover the wall 12 of the combustor 10. In some examples, the ceramic matrix composite liner 20 may at least partially cover the wall 12 of the combustor 10. The ceramic matric composite liner 20 may or may not be in contact with the wall 12 of the combustor 10. The ceramic matrix composite liner 20 may include ceramic fibers 22, as shown in FIGS. 2-3. Examples of the ceramic fibers 22 may include fibers of alumina, mullite, silicon carbide, zirconia, or carbon.

Figure 4:
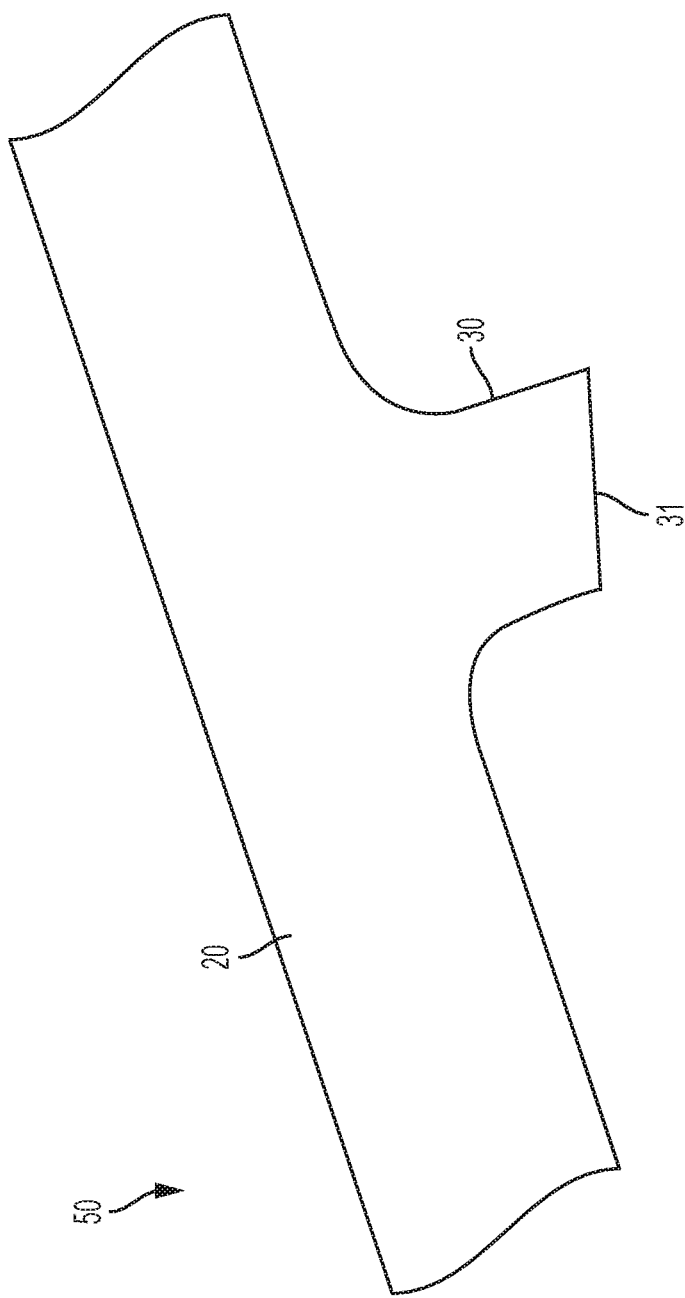
FIG. 4 illustrates a cross-sectional view of an example of a ceramic matrix composite body.

The ceramic matrix composite chute 30 may be a passage through which fluid, such as air, may pass. The ceramic matrix composite chute 30 may be in a form of a tube that is open at both ends of the tube. Alternatively, the ceramic matrix composite chute 30 may be in any other shape through which the passage may channel fluid. The ceramic matrix composite chute 30 may extend towards a midline 16 of the chamber 14 of the combustor 10. The ceramic matrix composite chute 30 may extend up to one inch towards the midline 16 of the chamber 14 of the combustor 10. The midline 16 may be a line that passes through the center of the combustor 10 in an axial direction and spans the combustor. The ceramic matrix composite chute 30 may define a chute opening 31 into the chamber 14 that is in a plane substantially parallel with a plane that is tangent to the ceramic matrix composite liner 20 where the ceramic matrix composite chute 30 and the ceramic matrix composite liner 20 intersect. Alternatively or in addition, the chute opening 31 may be scarfed, as shown in FIG. 4. The scarfed chute opening 31 may be an opening defined by a tapered end of the chute 30. The scarfed chute opening 31 may be formed by, for example, cutting a tapered end on the chute 30. Alternatively or in addition, the opening 31 of the ceramic matrix composite chute 30 may include a cross-sectional profile of a circle, oval, square, rectangle, trapezoid, or other shape. Like ceramic matrix composite liner 20, the ceramic matrix composite chute 30 may comprise ceramic fibers 22, as shown in FIGS. 2-3. Examples of the ceramic fibers 22 may include fibers of alumina, mullite, silicon carbide, zirconia, or carbon.

The ceramic matrix composite chute 30 may be integral with the ceramic matrix composite liner 20. In other words, the ceramic matrix composite chute 30 and the ceramic matrix composite liner 20 may be one continuous piece. The ceramic matrix composite chute 30 and the ceramic matrix composite liner 20 may be formed from a single ceramic preform 34, as shown in FIG. 2, resulting in one continuous piece without any seams between the ceramic matrix composite chute 30 and the ceramic matrix composite liner 20. Methods of forming the ceramic matrix composite chute 30 integral to the ceramic matrix composite liner 20 are described further below.

During operation of the combustion assembly 2, the ceramic matrix composite chute 30 directs mixing air into the chamber 14 of the combustor 10. The flow of mixing air is shown by arrow A in FIG. 1. As a result of the ceramic matrix composite chute 30 extending towards the midline 16 of the chamber 14 of the combustor 10, the flow of mixing air may avoid an axial flow of air passing through the chamber 14 of the combustor 10 and approach the midline 16 of the chamber 14 of the combustor 10. In other words, the chute 30 channels the mixing air toward the midline 16 allowing the mixing air to mix with fuel near the midline 16, resulting in more efficient combustion. Without the chute 30 extending towards the midline 16 of the chamber 14 of the combustor 10, the mixing air may not reach the fuel near the midline 16.

FIGS. 2 and 3 are plan views of examples of the ceramic preform 34 comprising a plurality of ceramic fibers 22. The ceramic preform 34 may be an arrangement of the ceramic fibers 22. The arrangement may be fixed in a desired shape. The arrangement of the ceramic fibers 22 may be a frame. The ceramic preform 34 is porous. Examples of the ceramic preform 34 may include a three-dimensional weave of the ceramic fibers 22. Alternatively or in addition, the ceramic preform 34 may include a two-dimensional weave of the ceramic fibers 22. The ceramic preform 34 may include multiple stacked layers of two-dimensional weaves of the ceramic fibers 22. Alternatively or in addition, the ceramic preform 34 may include a fiber layup, such as a unidirectional layup. The ceramic preform 34 may include multiple stacked layers of unidirectional layups of the ceramic fibers 22.

In some examples, each of the ceramic fibers 22 may be a bundle and/or a tow of ceramic fibers. The fibers in each bundle or tow may be braided or otherwise arranged.

The ceramic fibers 22 may comprise a material that is stable at temperatures above 1000 degrees Celsius. Examples of the ceramic fibers 22 may include fibers of alumina, mullite, silicon carbide, zirconia or carbon. The ceramic fibers 22 may not be organic, metallic or glass fibers.

FIG. 4 is a cross-sectional view of an example of a ceramic matrix composite body 50. The ceramic matrix composite body 50 may comprise the combustion liner 20 and the chute 30 as one continuous piece. The ceramic matrix composite chute 30 may define the chute opening 31, which may be scarfed.

Figure 5:
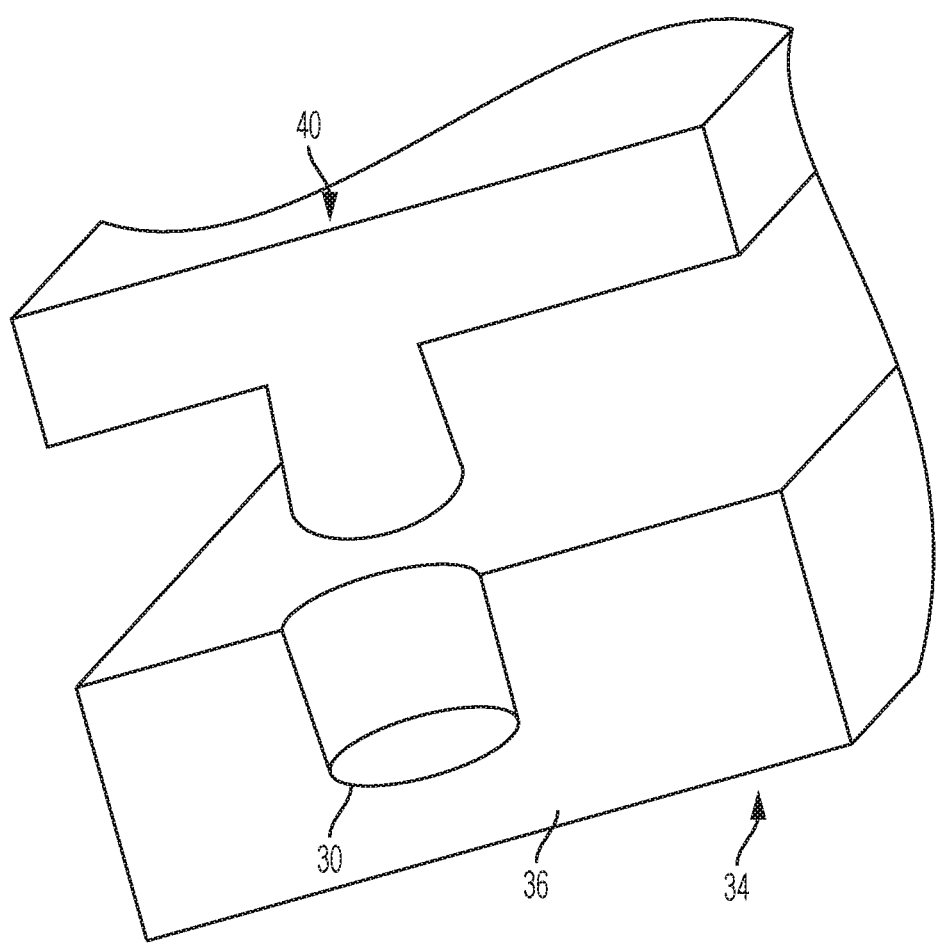
FIG. 5 illustrates a cross-sectional view of a ceramic preform and chute and a layup tool.

FIG. 5 is a cross-sectional view of the ceramic preform 34 and chute 30 and a layup tool 40. The ceramic preform 34 may be formed into a frame 36 for the combustion liner 20 and the chute 30. The frame 36 may be an underlying structure that gives shape or strength.

Figure 6:
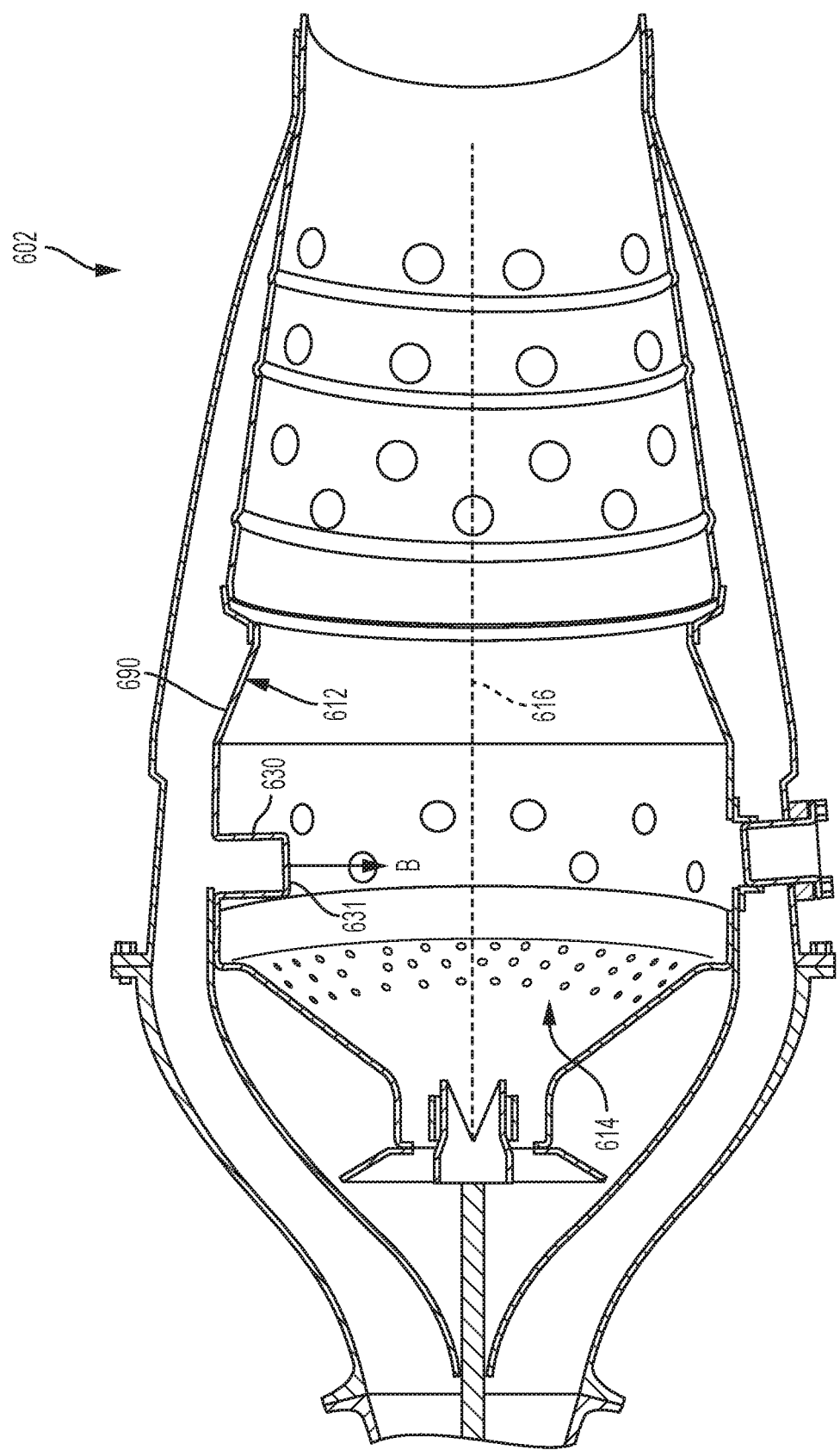
FIG. 6. illustrates another cross-sectional view of a combustion assembly for a gas turbine engine.

FIG. 6 is a cross-sectional view of another embodiment of a combustion assembly 602 for a gas turbine engine. The combustion assembly 602 may be a component capable of withstanding high temperatures, for example temperatures above 1000 degrees Celsius. The combustion assembly 602 may include, for example, a ceramic matrix composite combustor shell 690 and a ceramic matrix composite chute 630. In some examples, the combustion assembly 602 may include a ceramic matrix composite coating, an environmental barrier coating, or a combination thereof.

The ceramic matrix composite combustor shell 690 may comprise a wall 612 that defines a chamber 614. The ceramic matrix composite combustor shell 690 may be a ceramic matrix composite combustor with no metal backbone, a full annular ceramic matrix composite heat shield, or a ceramic matrix composite combustor tile. The full annular ceramic matrix composite heat shield may be a one piece ceramic matrix composite heat shield attached to a metal support structure and/or combustor. The ceramic matrix composite combustor tile may be one or more ceramic matrix composite pieces attached to a metal support structure and/or combustor.

The ceramic matrix composite combustor shell 690 may include ceramic fibers 22, as shown in FIGS. 2-3. Examples of the ceramic fibers 22 may include fibers of alumina, mullite, silicon carbide, zirconia, or carbon.

The ceramic matrix composite chute 630 may be a passage through which fluid, such as air, may pass. The ceramic matrix composite chute 30 may be in a form of a tube that is open at both ends of the tube. Alternatively, the ceramic matrix composite chute 630 may be in any other shape through which the passage may channel fluid. The ceramic matrix composite chute 630 may extend towards a midline 616 of the chamber 614. The ceramic matrix composite chute 630 may extend up to one inch towards the midline 616 of the chamber 614. The midline 616 may be a line that passes through the center of the ceramic matrix composite combustor shell 690 in an axial direction and spans the combustor. The ceramic matrix composite chute 630 may define a chute opening 631 into the chamber 614 that is in a plane substantially parallel with a plane that is tangent to the ceramic matrix composite combustor shell 690 where the ceramic matrix composite chute 630 and the ceramic matrix composite combustor shell 690 intersect. Alternatively or in addition, the chute opening 631 may be scarfed. The scarfed chute opening 631 may be an opening defined by a tapered end of the chute 630. The scarfed chute opening 631 may be formed by, for example, cutting a tapered end on the chute 630. Alternatively or in addition, the opening 631 of the ceramic matrix composite chute 630 may include a cross-sectional profile of a circle, oval, square, rectangle, trapezoid, or other shape. Like ceramic matrix composite combustor shell 690, the ceramic matrix composite chute 630 may comprise ceramic fibers 22, as shown in FIGS. 2-3. Examples of the ceramic fibers 22 may include fibers of alumina, mullite, silicon carbide, zirconia, or carbon.

The ceramic matrix composite chute 630 may be integral with the ceramic matrix composite combustor shell 690. In other words, the ceramic matrix composite chute 630 and the ceramic matrix composite combustor shell 690 may be one continuous piece. The ceramic matrix composite chute 630 and the ceramic matrix composite combustor shell 690 may be formed from a single ceramic preform 34, as shown in FIG. 2, resulting in one continuous piece without any seams between the ceramic matrix composite chute 630 and the ceramic matrix composite combustor shell 690. Methods of forming the ceramic matrix composite chute 630 integral to the ceramic matrix composite combustor shell 690 are described further below. The methods of forming the ceramic matrix composite chute 630 integral to the ceramic matrix composite combustor shell 690 are the same whether the ceramic matrix composite chute 630 is integral to the ceramic matrix composite combustor with no metal backbone, the full annular ceramic matrix composite heat shield, or the ceramic matrix composite combustor tile.

During operation of the combustion assembly 602, the ceramic matrix composite chute 630 directs mixing air into the chamber 614. The flow of mixing air is shown by arrow B in FIG. 6. As a result of the ceramic matrix composite chute 630 extending towards the midline 616 of the chamber 614, the flow of mixing air may avoid an axial flow of air passing through the chamber 614 and approach the midline 616 of the chamber 614. In other words, the chute 630 channels the mixing air toward the midline 616 allowing the mixing air to mix with fuel near the midline 616, resulting in more efficient combustion. Without the chute 630 extending towards the midline 616 of the chamber 614, the mixing air may not reach the fuel near the midline 616.

Figure 7:
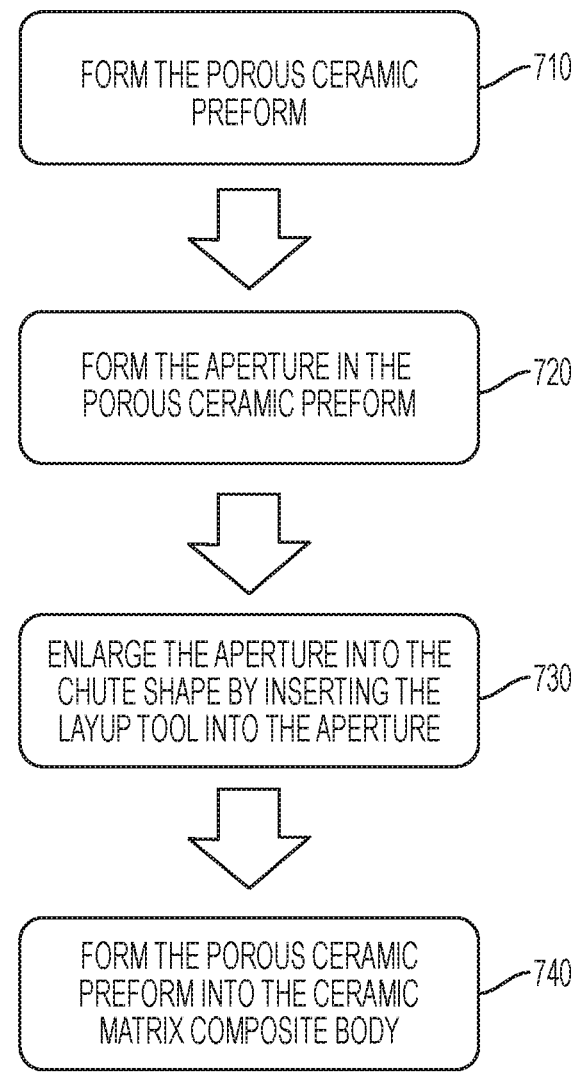
FIG. 7 illustrates a flow chart of a method for fabricating a ceramic matrix composite chute.

FIG. 7 illustrates a flow chart of an example method for fabricating the ceramic matrix composite chute 30. The method may include additional, fewer, or different steps than illustrated in FIG. 7.

First, the ceramic fibers 22 may be formed (710) into the ceramic preform 34. Next, the aperture 32 may be formed (720) in the ceramic preform 34. The aperture 32 may be enlarged (730) into the chute shape by inserting the layup tool 40 into the aperture 32. Finally, the ceramic preform 34 may be formed (740) into the ceramic matrix composite body 50 that comprises the combustion liner 20 and the chute 30. More generally, the ceramic preform 34 may be formed into the ceramic matrix composite body 50 that comprises the ceramic matrix composite combustor shell 690 and the chute 30.

In some examples, forming the porous ceramic preform 34 comprising the ceramic fibers 22 may include shaping the ceramic fibers 22 into a desired shape. Forming the porous ceramic preform 34 may include configuring the ceramic fibers 22 into one or more shapes. Alternatively or in addition, forming the porous ceramic preform 34 may include stacking two-dimensional weaves or unidirectional tape layups, or weaving the ceramic fibers 22 in three dimensions.

In some examples, forming the aperture 32 in the porous ceramic preform 34 may include leaving a gap in the porous ceramic preform 34. Forming the aperture 32 in the porous ceramic preform 34 may include cutting a hole in the porous ceramic preform 34. Forming the aperture 32 in the porous ceramic preform 34 may include forming an opening in each two-dimensional weave or unidirectional tape layup and aligning the openings in the stacked plurality of two-dimensional weaves or unidirectional tape layups. Forming the aperture 32 in the porous ceramic preform 34 may include weaving the aperture 32 into the porous ceramic preform 34.

In some examples, enlarging the aperture 32 into the chute shape by inserting the layup tool 40, as shown in FIG. 5, into the aperture 32 may include shaping the aperture 32 into the larger chute shape with the layup tool 40. Enlarging the aperture 32 into the chute shape by inserting the layup tool 40 into the aperture 32 may include pressing the layup tool 40 into the aperture 32 until the larger chute shape remains. The layup tool 40 may be a material that shapes the porous ceramic preform 34. The layup tool 40 may be the inverse of the desired chute shape. The layup tool 40 may create a chute shape with the chute opening 31 that is substantially parallel with the combustion liner 20 or with the ceramic matrix composite combustor shell 690. Alternatively or in addition, the layup tool 40 may create a chute shape from the chute opening 31 that is scarfed In some examples, forming the porous ceramic preform 34 into the ceramic matrix composite body 50, as shown in FIG. 4, may include infiltrating a molten metal or alloy (for example, a silicon metal or alloy) into the ceramic preform 34. The silicon metal or alloy may fill gaps between the ceramic fibers 22. The silicon metal or alloy may also react with a reactive element source present in the ceramic preform 34 to form additional silicon based ceramic matrix material. In some examples, a chemical vapor infiltration coating may be applied to the ceramic preform 34 prior to the melt infiltration to stiffen the ceramic fibers 22. Alternatively or in addition, forming the ceramic matrix composite body 50 from the ceramic preform 34 may include chemical vapor infiltrating the ceramic preform 34 instead of melt infiltrating a material into the ceramic preform 34.

Prior to melt infiltration and/or chemical vapor infiltration, the ceramic matrix composite body 50 may be formed by a slurry infiltration process. A slurry comprising a solvent and the solid particulate matter may be infiltrated into the ceramic preform 34 assembled from silicon carbide fibers. Prior to introducing the slurry, the ceramic preform 34 may be exposed to a vacuum, and the vacuum may be removed during infiltration to create a pressure gradient (for example, about 1 atm) that forces slurry into the preform. The infiltration may be carried out at room temperature (for example, from about 15° C. to about 25° C.). After infiltration, the ceramic matrix composite body 50 may be dried to remove the solvent. Drying may be carried out at room temperature or at an elevated temperature (for example, from about 40° C. to about 150° C.). Typically, slurry infiltration leads to a loading level of solid particulate matter in the ceramic matrix composite body 50 of from about 40 vol. % to about 60 vol. %, with the remainder being porosity. Alternatively or in addition, forming the ceramic matrix composite body 50 from the ceramic preform 34 may include slurry infiltrating the ceramic preform 34 instead of melt infiltrating a material into the ceramic preform 34.

Figure 8:
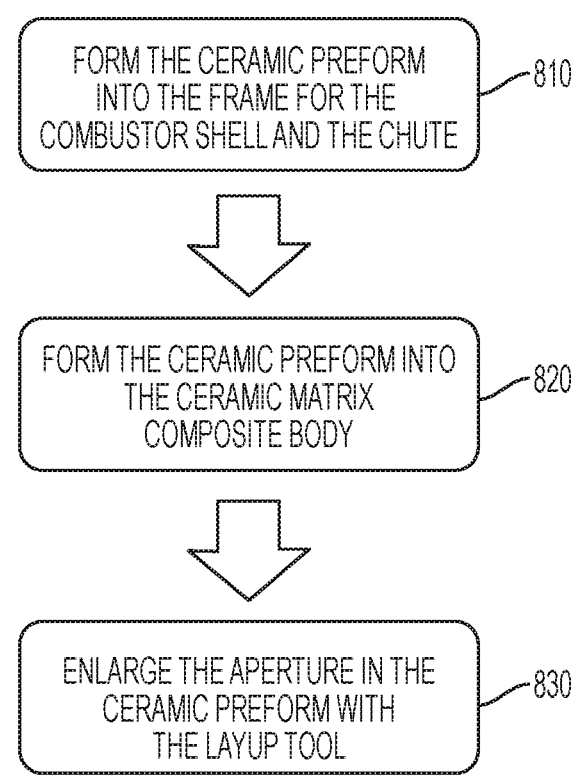
FIG. 8 illustrates a flow chart of another method for fabricating a ceramic matrix composite chute.

FIG. 8 illustrates a flow chart of a second example method for fabricating the ceramic matrix composite chute 30. The method may include additional, fewer, or different steps than illustrated in FIG. 8.

First, the ceramic preform 34 may be formed (810) into the frame 36 for the combustion liner 20 and the chute 30. Next, the ceramic preform 34 may be formed (820) into the ceramic matrix composite body 50. Finally, the aperture 32 may be enlarged (830) in the ceramic preform 34 with the layup tool 40.

In some examples, forming the ceramic preform 34 may include shaping the ceramic preform 34 into a desired shape. The ceramic preform 34 may be formed into the frame 36 for the combustion liner 20 and for the plurality of chutes 30. The ceramic matrix composite body 50 may include the combustion liner 20 and the chutes 30. Forming the ceramic matrix composite body 50 may comprise chemical vapor infiltration, slurry infiltration, or melt infiltration into the ceramic preform 34.

In some examples, enlarging the aperture 32 in the ceramic preform 34 with the layup tool 40 may include shaping the aperture 32 into the larger chute shape with the layup tool 40. The layup tool 40 may include a cylinder. The aperture 32 may be enlarged when the cylinder is inserted into the aperture 32. Alternatively or in addition, enlarging the aperture 32 in the ceramic preform 34 with the layup tool 40 may include moving ceramic fibers 22 in the ceramic preform 34 such that the ceramic fibers 22 extend from the combustion liner 20 into the chute 30 in the ceramic matrix composite body 50.

Each component may include additional, different, or fewer components. For example, the ceramic matrix composite body 50 may include more than one chute 30 or more than one combustion liner 20. Alternatively or in addition, the layup tool 40 may include multiple components, such as the cylinder and a handle.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A method for fabricating a ceramic matrix composite chute, comprising:
    forming a porous ceramic preform comprising a plurality of ceramic fibers;
    forming an aperture in the porous ceramic preform;
    enlarging the aperture into a chute shape by inserting a layup tool into the aperture; and
    forming the porous ceramic preform into a ceramic matrix composite body, the ceramic matrix composite body comprising a combustor shell and a chute, wherein the combustor shell comprises a chamber defined by a wall of the combustor shell and the chute extends from the combustor shell towards a midline of the chamber of the combustor shell.

2. The method of claim 1, wherein forming the porous ceramic preform comprises stacking a plurality of two-dimensional weaves.

3. The method of claim 2, wherein forming the aperture in the porous ceramic preform comprises forming an opening in each two-dimensional weave and aligning the openings in the stacked plurality of two-dimensional weaves.

4. The method of claim 1, wherein forming the porous ceramic preform comprises stacking a plurality of unidirectional tape layups.

5. The method of claim 4, wherein forming the aperture in the porous ceramic preform comprises forming an opening in each unidirectional tape layup and aligning the openings in the stacked plurality of unidirectional tape layups.

6. The method of claim 1, wherein forming the aperture in the porous ceramic preform comprises cutting the aperture into the porous ceramic preform.

7. The method of claim 1, wherein forming the aperture in the porous ceramic preform comprises weaving the aperture into the porous ceramic preform.

8. The method of claim 1, wherein forming the porous ceramic preform into the ceramic matrix composite body comprises treating the porous ceramic preform with one or more of a chemical vapor infiltration, a slurry infiltration, or a melt infiltration.

9. The method of claim 1, wherein the plurality of ceramic fibers are braided.

10. A method for fabricating a ceramic matrix composite chute, comprising:
    forming a ceramic preform into a frame for a combustor shell and a chute;
    forming the ceramic preform into a ceramic matrix composite body, the ceramic matrix composite body comprising the combustor shell and the chute, wherein the combustor shell comprises a chamber defined by a wall of the combustor shell and the chute extends from the combustor shell towards a midline of the chamber of the combustor shell; and
    enlarging an aperture in the ceramic preform with a layup tool.

11. The method of claim 10, wherein the layup tool includes a cylinder, the aperture is enlarged when the cylinder is inserted into the aperture.

12. The method of claim 10 further comprising moving ceramic fibers in the ceramic preform with the layup tool when enlarging the aperture such that the ceramic fibers extend from the combustor shell into the chute in the ceramic matrix composite body.

13. The method of claim 10, wherein forming the ceramic preform comprises forming the ceramic preform into the frame for the combustor shell and for a plurality of chutes, and, wherein the ceramic matrix composite body comprises the combustor shell and the chutes.

14. The method of claim 10 wherein forming the ceramic matrix composite body comprises one or more of a chemical vapor infiltration, a slurry infiltration, or a melt infiltration.

15. A method for fabricating a ceramic matrix composite chute, comprising:
- forming a porous ceramic preform from a three-dimensional weave of ceramic fibers;
- forming an aperture in the porous ceramic preform;
- enlarging the aperture into a chute shape by inserting a layup tool into the aperture; and
- forming the porous ceramic preform into a ceramic matrix composite body, the ceramic matrix composite body comprising a combustor shell and a chute, wherein the combustor shell comprises a chamber defined by a wall of the combustor shell and the chute extends from the combustor shell towards a midline of the chamber of the combustor shell.

16. The method of claim 15, wherein forming the aperture in the porous ceramic preform comprises cutting the aperture into the porous ceramic preform.

17. The method of claim 15, wherein forming the aperture in the porous ceramic preform comprises weaving the aperture into the porous ceramic preform.

18. The method of claim 15, wherein enlarging the aperture into the chute shape by inserting the layup tool into the aperture comprises pressing the layup tool into the aperture until the chute shape becomes larger.

19. The method of claim 15, wherein forming the porous ceramic preform into the ceramic matrix composite body comprises treating the porous ceramic preform with one or more of a chemical vapor infiltration, a slurry infiltration, or a melt infiltration.

20. The method of claim 15, wherein the ceramic fibers are braided.

\* \* \* \* \*